(12) United States Patent
Mildner

(10) Patent No.: US 8,235,159 B2
(45) Date of Patent: Aug. 7, 2012

(54) MOTOR VEHICLE HAVING WINDSHIELD AIRBAG

(75) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 12/792,512

(22) Filed: Jun. 2, 2010

(65) Prior Publication Data

US 2010/0307854 A1 Dec. 9, 2010

(30) Foreign Application Priority Data

Jun. 3, 2009 (DE) .......................... 10 2009 023 779

(51) Int. Cl.
*B60K 28/14* (2006.01)
*B60R 21/34* (2011.01)
(52) U.S. Cl. ...................................................... 180/274
(58) Field of Classification Search .................. 180/274; 280/730.1; 296/187.04; *B60R 21/34*
See application file for complete search history.

(56) References Cited

U.S. PATENT DOCUMENTS

| | | | |
|---|---|---|---|
| 3,199,787 A * | 8/1965 | Oishei et al. ................ | 239/284.1 |
| 6,827,170 B2 * | 12/2004 | Hamada et al. ................ | 180/274 |
| 7,211,752 B2 * | 5/2007 | Okamoto et ........... | 200/61.58 R |
| 7,243,754 B2 | 7/2007 | Mori et al. | |
| 7,341,274 B2 | 3/2008 | Mori et al. | |
| 7,357,212 B2 | 4/2008 | Sasaki et al. | |
| 2003/0159875 A1* | 8/2003 | Sato et al. ..................... | 180/274 |
| 2004/0124621 A1* | 7/2004 | Knight-Newbury et al. . | 280/748 |
| 2004/0182629 A1* | 9/2004 | Takahashi et al. ........... | 180/274 |
| 2008/0202839 A1* | 8/2008 | Satou et al. ................... | 180/274 |
| 2008/0314672 A1 | 12/2008 | Takimoto et al. | |
| 2009/0066069 A1 | 3/2009 | Takahashi et al. | |

FOREIGN PATENT DOCUMENTS

| | | |
|---|---|---|
| DE | 10315588 A1 | 10/2004 |
| DE | 102005012135 A1 | 10/2005 |
| DE | 102005012136 A1 | 10/2005 |
| DE | 102005027432 A1 | 12/2005 |
| DE | 102004029757 A1 | 1/2006 |
| DE | 102007033796 A1 | 1/2009 |
| JP | 2006044289 A | 2/2006 |

OTHER PUBLICATIONS

German Patent Office, German Search Report for Application No. 102009023779.8, dated Feb. 17, 2010.

* cited by examiner

*Primary Examiner* — Paul N Dickson
*Assistant Examiner* — Robert A Coker
(74) *Attorney, Agent, or Firm* — Ingrassia Fisher & Lorenz, P.C.

(57) ABSTRACT

A motor vehicle has a front hood, a windshield, and an airbag, which is installed on the front hood and at least partially overlaps the windshield in the expanded state. A detachable connection is provided between a shell, which is fastened on a lower side of the front hood and receives the airbag, and the hood, at least along a rear edge of the shell.

15 Claims, 4 Drawing Sheets

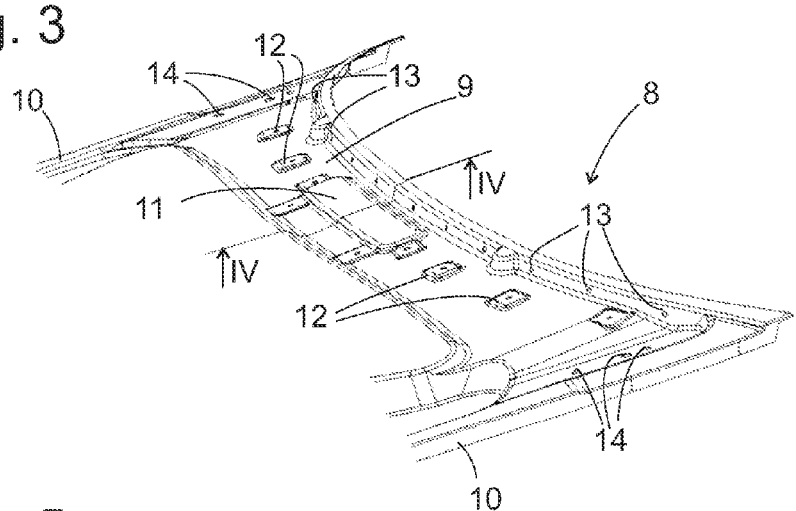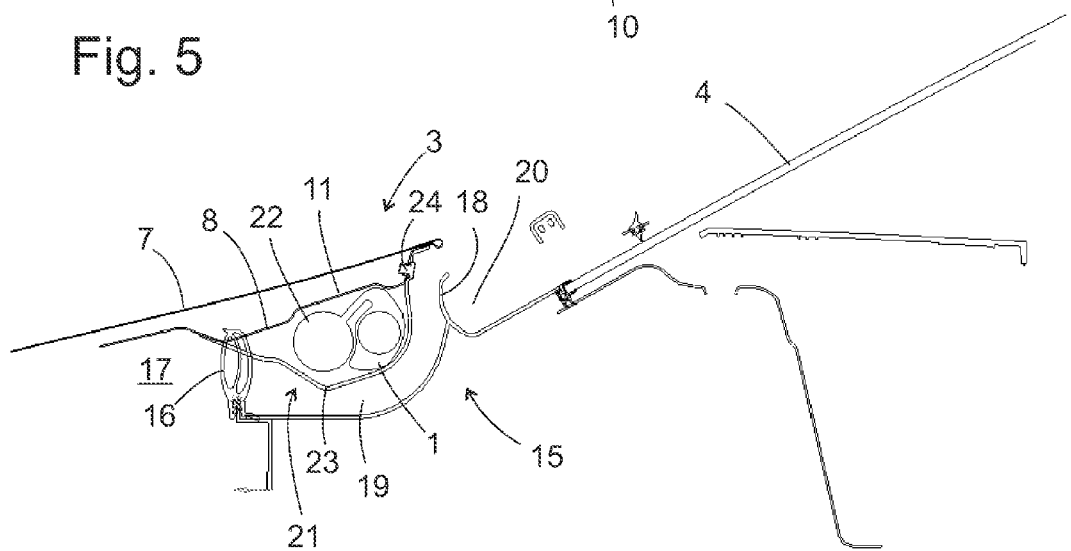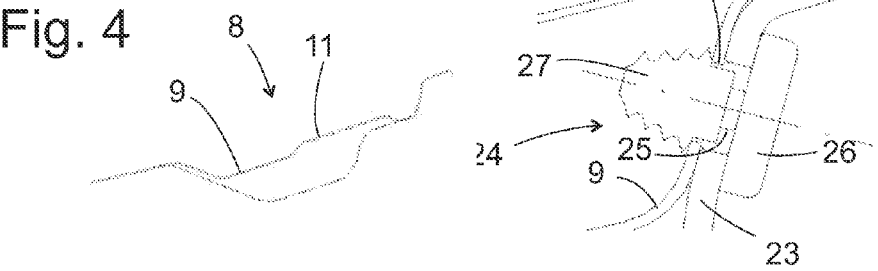

MOTOR VEHICLE HAVING WINDSHIELD AIRBAG

CROSS-REFERENCE TO RELATED APPLICATION

This application claims priority to German Patent Application No. 102009023779.8, filed Jun. 3, 2009, which is incorporated herein by reference in its entirety.

TECHNICAL FIELD

The present invention relates to a motor vehicle having a front hood, a windshield, and an airbag, which is installed on the front hood and at least partially overlaps the windshield in the extended state. Such an airbag is useful in order to dampen the impact of the head of a pedestrian on the windshield and reduce the danger of severe injuries in case of a collision with the pedestrian.

BACKGROUND

A motor vehicle of the type set forth in the technical field is generally known, for example, from U.S. Pat. No. 7,243,754 B2. The airbag is concealed under a lid incorporated in the front hood here. The airbag blows off the lid upon triggering, in order to subsequently spread out over a rear area of the hood and the lower and lateral edges of the windshield.

The attachment of the airbag to the hood is fundamentally advantageous, because the airbag does not obstruct the access to the engine compartment below the hood when the airbag or a housing receiving it is raised together with the hood when the hood is opened. However, it is annoying that the lid represents a visible foreign body on the hood. In addition, the lid must be fastened tightly on the hood in order to protect the airbag from moisture, which makes replacing the destroyed lid difficult in case of incorrect triggering, and results in high repair costs.

A motor vehicle having a so-called active hood is known from DE 103 15 588 A1, i.e., a hood which is raised by actuators in case of an accident, in order to increase the distance to an engine block lying underneath and thus provide a longer pathway, on which the body of a pedestrian hitting the hood can be decelerated, without contact occurring with the engine block. An airbag is attached adjacent to a water pan below the hood in this known vehicle. The airbag is designed to cover the windshield and the A columns of the vehicle body in case of a collision.

At least one object of the present invention is to provide a motor vehicle with an airbag which at least partially overlaps the windshield in the expanded state, in the case of which the airbag is attached inconspicuously and well protected from moisture. In addition, other objects, desirable features and characteristics will become apparent from the subsequent summary and detailed description, and the appended claims, taken in conjunction with the accompanying drawings and this background.

SUMMARY

The at least one object, other objects, desirable features and characteristics, are achieved in that in the case of a motor vehicle having a front hood, a windshield, and an airbag, which is installed on the front hood and at least partially overlaps the windshield in the expanded state, a detachable connection is provided between a shell fastened on a lower side of the front hood, which receives the airbag, and the hood, at least along a rear edge of the shell.

A lid for the airbag which is visible on the vehicle body in the normal state is therefore not required. The shell which receives the airbag, in order to protect it from moisture, is not visible when the hood is closed because it is fastened on the lower side of the front hood. In that the connection between shell and hood is detachable at least along the rear edge of the shell, the airbag can exit there between hood and shell if needed and spread out on the windshield.

Implementing a front hood as multilayered, having an outer skin and a reinforcement profile, which is concealed below the outer skin and stiffens it, is known per se. In such a hood, the detachable connection between the front hood and the shell can comprise at least one plug-in part engaging in openings of the shell and a reinforcement profile.

The plug-in part preferably has an intended breakpoint, which, upon triggering of the airbag, can be destroyed by its expansion or also in other ways.

In a front area of the shell, a permanent connection is preferably provided between the shell and the front hood, i.e., a connection which is not destroyed by the actuation of the airbag. The persistence of the connection in the front area of the shell forces it into a pivot movement upon actuation of the airbag. This provides a wide opening between the hood and the rear edge of the shell, through which the airbag can exit, upon a small stroke.

The permanent connection expediently also exists between the shell and the reinforcement profile of the hood. In order to reliably withstand the forces occurring upon triggering of the airbag, the wall thickness of the reinforcement profile can be locally increased in the area of the permanent connection.

A locally increased wall thickness of the reinforcement profile can additionally be provided in the engagement area of a hood hinge on the reinforcement profile.

Local reinforcements of this type allow the reinforcement profile to be implemented as flatter than is generally typical and thus additional space to be provided for housing the airbag under the hood.

In order to relieve the front area of the shell when the airbag is triggered, the airbag can be held in the shell by at least one support arm, which is fastened directly on the front hood and has a free end directed to the rear, in order to thus orient the expansion of the airbag to the rear. Such a support arm can be installed with little effort, in that it is clamped by a screw between the front hood and the shell.

A water pan can extend below the shell, so that upon actuation of the airbag, the shell can firstly yield downward into the water pan in order to give the airbag space for expansion. The water pan simultaneously represents a guide surface upon triggering of the airbag, which reliably guides the airbag out of the engine compartment and onto the windshield. A further object of the invention can therefore be seen as providing a vehicle body structure, by which an airbag installed under the front hood is reliably conducted to the windshield in case of its actuation.

A seal which keeps precipitation water away from the engine compartment is expediently situated between a front edge of the water pan and the front area of the shell.

The water pan can have a wall running below a rear edge of the hood, which divides the water pan into a front and a rear trough. The front trough and with it the exterior of the shell is thus extensively protected from precipitation water, and the danger is correspondingly low that moisture will penetrate into the shell and/or reach the airbag.

In order to make the exit of the expanding airbag from the engine compartment onto the windshield easier, the wall is expediently deformable under the pressure of the expanding airbag.

To simplify the assembly, the shell can simultaneously be used as a carrier for a nozzle of a windshield washing apparatus.

A supply hose for the nozzle expediently extends between the nozzle and a coupling part on the outer side of the shell. The shell can thus be readily preassembled as a unit and connected to a supply system for windshield washing liquid after its installation in a vehicle.

The front hood can be of the active type, i.e., it can be raised automatically in the event of an accident. The raising can be achieved solely by the described airbag in an embodiment. A separate actuator can also be provided for raising the hood, so as not to delay the spreading out of the airbag on the windshield.

If the space between the rear edge of the hood and the windshield is sufficient for the exit of the airbag without raising the hood, in particular after pressing the deformable wall aside, the raising can also be dispensed with. The construction of the hinges which guide the typical pivot movement of the hood is thus simplified.

If provided, the actuator is preferably reversible, so that in case of incorrect triggering, i.e., in particular in the event of an accident which has resulted in the triggering of the actuator and the airbag, but would not have required this and after which the vehicle is still drivable, the hood can be lowered again after removal of the airbag. The vehicle can thus be driven to a repair station without requiring external aid.

BRIEF DESCRIPTION OF THE DRAWINGS

The present invention will hereinafter be described in conjunction with the following drawing figures, wherein like numerals denote like elements, and:

FIG. 3 shows a perspective partial view of a reinforcement profile of the hood;

FIG. 4 shows a schematic section through the reinforcement profile;

FIG. 5 shows a schematic section through the rear area of the hood and parts of the motor vehicle body adjoining thereon;

FIG. 6 shows an enlarged detail from FIG. 5;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
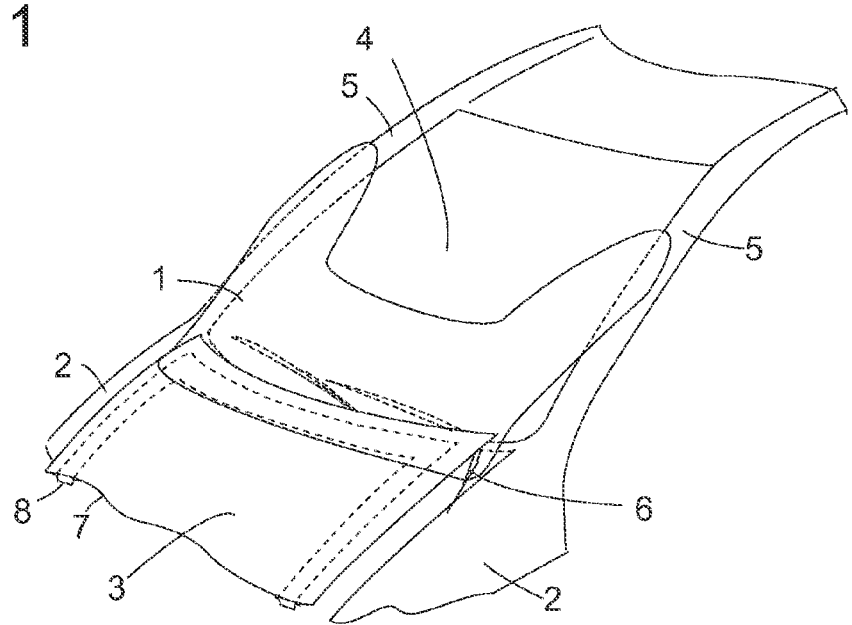
FIG. 1 shows a schematic perspective partial view of the vehicle body of a motor vehicle having raised hood and expanded airbag.

FIG. 1 shows a simplified perspective view of a part of the vehicle body of a motor vehicle according to a first embodiment of the invention after an accident, which has resulted in the triggering of an airbag 1. The engine hood 3, which is normally flush with adjacent fenders 2, has been raised by the airbag 1 itself or by actuators (not shown) into a position in which the airbag 1, which is installed on the lower side of the hood 3, can exit through a gap between the rear edge of the hood 3 and the windshield 4 and can lay itself over the windshield 4 and the A columns 5 of the vehicle body which enclose it. Hinges 6, which normally guide a pivot movement of the hood 3 between the open and closed positions in a typical way, have been partially detached from their anchors, in order to allow raising the hood 3 over its entire area.

Figure 2:
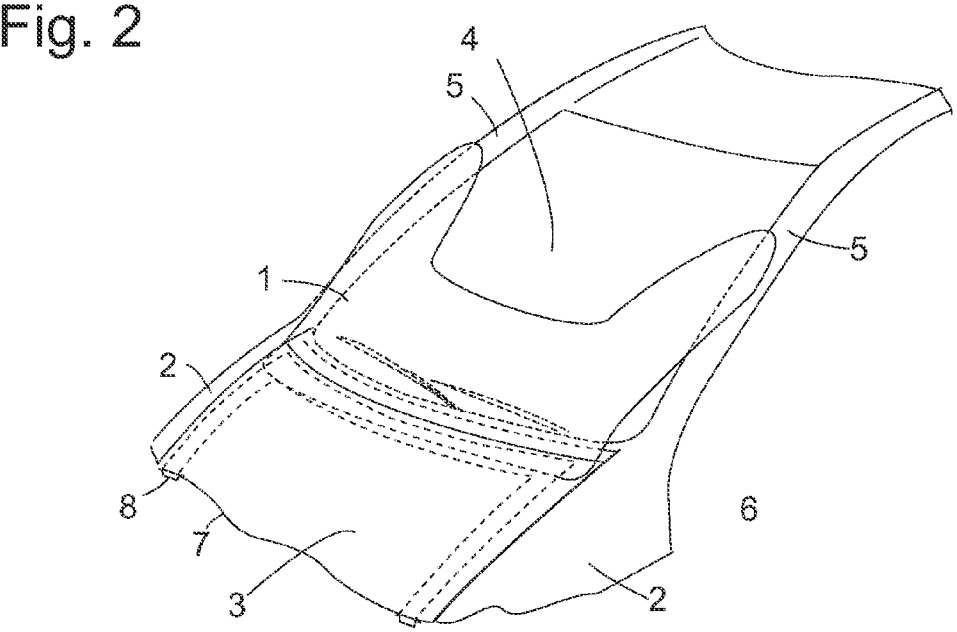
FIG. 2 shows a perspective partial view, similar to FIG. 1, of the vehicle body of a motor vehicle having stationary hood and expanded airbag.

FIG. 2 shows a part of a motor vehicle body according to a second embodiment of the invention after triggering of an airbag 1. This vehicle body differs from that of FIG. 1 through the absence of actuators for raising the hood 3; the hood is also flush with the fenders 2 after triggering of the airbag here. Instead, there is a gap between the rear edge of the hood 3 and the base of the windshield 4, which offers sufficient space to the airbag 1, even in the normal closed position of the hood 3, to exit below the hood and lay itself on the windshield 4.

In both embodiments, the hood 3 typically comprises an external skin 7 made of sheet-metal, which is easily deformable alone, and a reinforcement profile 8 stiffening this external skin 7, in the form of a frame deep-drawn in one piece from a plate, extending along the edges of the external skin 7 here.

A rear area of the reinforcement profile 8 is shown in a perspective view in FIG. 3. A transverse strut 9 of the reinforcement profile 8, which extends along the rear edge of the hood 3, is significantly wider, but flatter, than longitudinal struts 10 running along the lateral edges of the hood. Through the wide and flat cross-sectional shape of the transverse strut 9 in comparison to the longitudinal struts 10, space is provided under it for housing the airbag 1, as will be explained in greater detail in the course of the further description. A convexity 11, which is directed upward, is centrally formed in a central plateau of the longitudinal struts 10, in order to provide sufficient space underneath it for housing a gas generator of the airbag 1. Smaller convexities 12 and holes 13 on a rear edge of the transverse strut 9 are used for fastening an airbag assembly, as explained in greater detail hereafter.

In order to ensure solid anchoring of the airbag assembly, the reinforcement profile 8 can be locally reinforced in the area of the convexities 12, preferably by laser-welded lamina. A corresponding reinforcement can also be provided in the surroundings of holes 14 used for fastening the hinges 6.

FIG. 4 shows a section through the reinforcement profile 8 along the plane identified by IV-IV in FIG. 3 in comparison to a cross-section, shown by dot-dash lines, of a typical reinforcement profile, which shows the relatively flat and wide cross-sectional shape of the transverse strut 9.

FIG. 5 shows a section, also along plane IV-IV of FIG. 3, through a rear area of the closed hood 3, located in the normal position, and a front area of the windshield 4. A water pan 15 adjoining the lower edge of the windshield 4 extends to below the hood 3 and carries a flexible seal 16 on its front edge, which is shown in the relaxed state in FIG. 5, but is elastically compressed vertically by contact with the closed hood 3 in reality, so that it tightly adjoins the hood 3 and prevents the penetration of any precipitation water from the water pan 15 into the engine compartment 17.

The water pan 15, which is molded from plastic, is divided by a deformable wall 18, which extends along the rear edge of the hood 3, into a front trough 19 and a rear trough 20. The wall 18 extensively holds back precipitation water from the front trough 19.

The front trough 19 is largely filled up by an airbag assembly 21, which comprises a gas generator 22, the collapsed airbag 1, which is connected to the gas generator 22, and a shell 23, which receives the gas generator 22 and the airbag 1 and is fastened below the transverse strut 9 on the hood 3. Along a rear edge of the shell 23, its fastening on the hood 3 consists of clips 24 which are plugged into holes of the shell 23 and the holes 13 of the transverse strut 9. FIG. 6 shows such a clip 24 in the installed state in section. The clips 24 have an intended breakpoint 25 between a head 26, which presses externally against the shell 23, and a shaft 27 engaging in the transverse strut 9, so that in normal operation they anchor the shell fixedly on the transverse strut 9, but they tear readily and release the rear edge of the shell 23 when the airbag 1 begins to expand in the interior of the shell 23.

Figure 7:
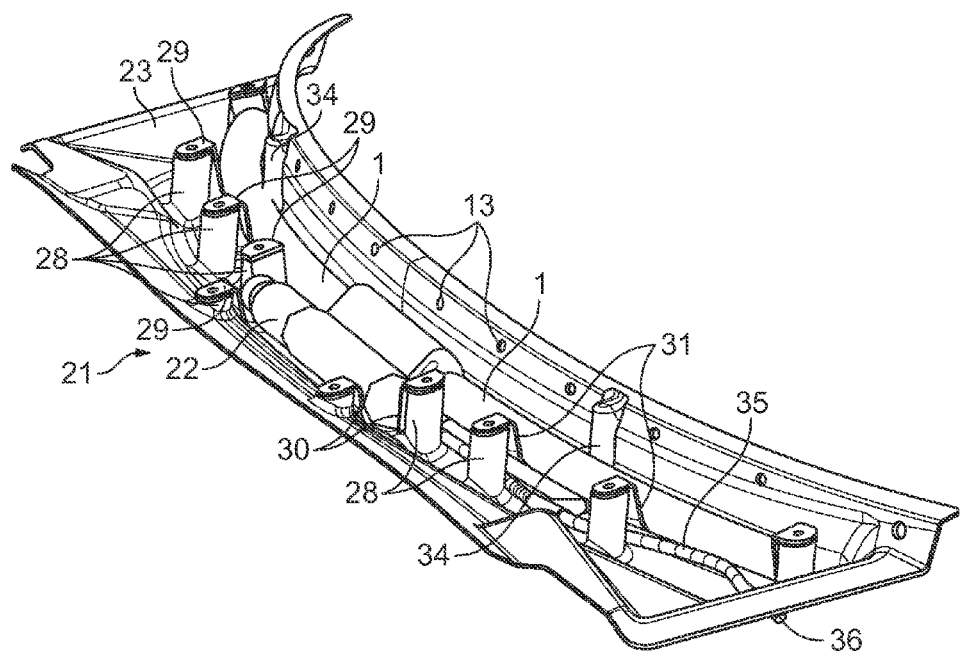
FIG. 7 shows a perspective view of the shell receiving the airbag.
Figure 8:
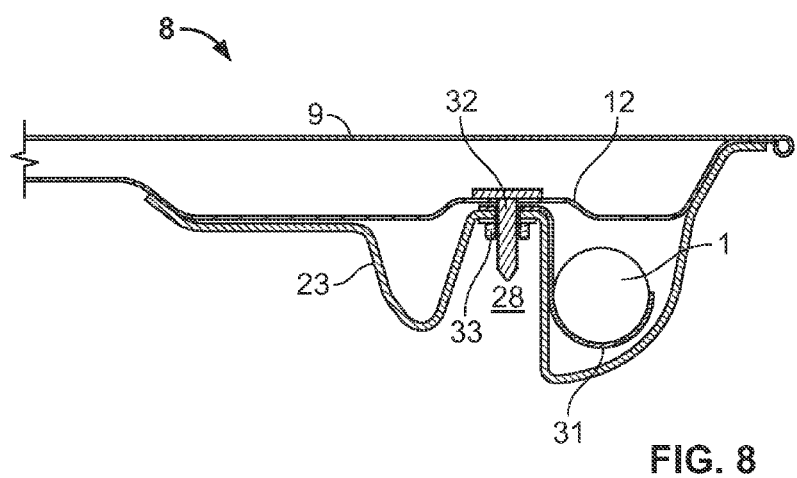
FIG. 8 shows a schematic section through the rear area of the hood with installed shell and airbag.

FIG. 7 shows a perspective view of the airbag assembly 21. Multiple columns 28 are molded in the shell 23, which is injection molded or deep drawn from plastic, on which tabs 29 of a support bracket 30, which supports the gas generator 22, and/or of hooks 31 holding the collapsed airbag 1, rest. In the installed state, the columns 28 having the tabs resting thereon engage in the convexities 12 of the transverse strut 9 and are fastened therein, as shown in section in FIG. 8, with the aid of a weld screw 32 and a nut 33 in a way which is strong enough to withstand triggering of the airbag 1.

With reference to FIG. 7 once again, two projections in the form of half-columns are shown on a rear wall of the shell 23. These are nozzles 34 of a windshield washing system, which are supplied with cleaning liquid through a common supply line 35 running on the floor of the shell 23. A coupling 36 is attached externally on the shell 23 at one end of the supply line 35. The airbag assembly 21 including the nozzles 34 and the supply line 35 can thus be readily preassembled outside the vehicle, inserted therein, and connected via the coupling 36 to a supply system for cleaning liquid of the vehicle.

Figure 10:
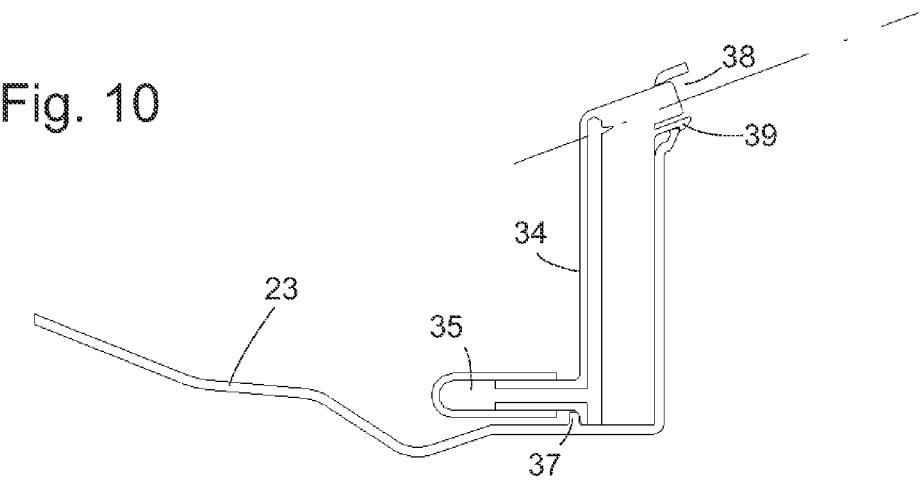
FIG. 10 shows a schematic sectional view of a part of the shell and a windshield wiper nozzle installed thereon.

FIG. 10 shows a schematic section through a nozzle 34 and a part of the shell 23, in which the nozzle 34 is installed. A lower end of the elongate nozzle body is held on the floor of the shell 23 in a recess enclosed by a low web 37. The upper end of the nozzle body engages in a passage 38 on the upper edge of the shell 23 and is anchored in the passage by an elastic detent finger 39 engaging on the edge of the passage 38.

Figure 9:
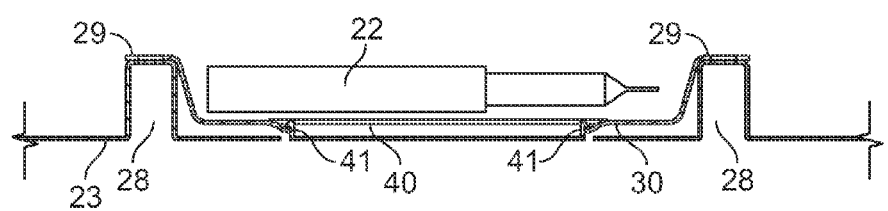
FIG. 9 shows a schematic section through the shell in a plane perpendicular to the sectional plane of FIG. 8.

FIG. 9 shows a schematic longitudinal section through the gas generator 22 and its surroundings. The support bracket 30, on which the gas generator rests, has two tabs 29 resting on columns 28. Two elastic detent fingers 41 of the shell 23 engage from below in a slot 40 in a floor plate of the support bracket 30, which fix the support bracket 30 and, with it, the gas generator 22 in location, before the airbag assembly 21 is screwed on under the hood 3.

Figure 11:
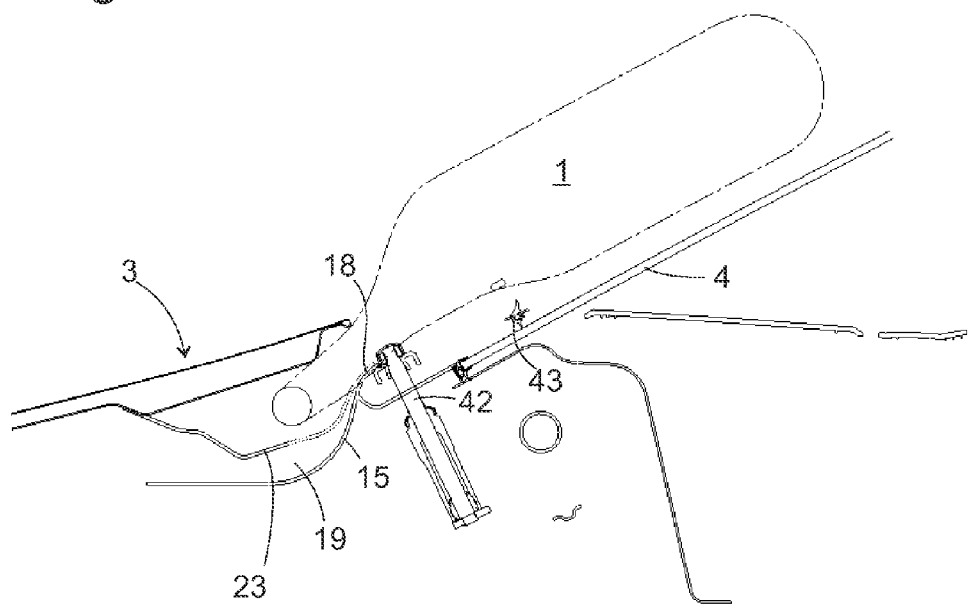
FIG. 11 shows a schematic section similar to FIG. 5, which shows the airbag in the expanded state.

FIG. 11 shows the expanded state of the airbag 1 in a section similar to FIG. 4. The connection between the shell 23 and the hood 3 has been blown apart along the rear edge of the shell 23, and the shell 23 is folded downward into the front trough 19 of the water pan 15. The airbag 1 exiting through the gap thus resulting has pressed the wall 18 of the water pan forward against the windshield wiper shaft 42, and the airbag 1 has spread out, guided by the wall 18, over the windshield wiper shaft 42 and the windshield wiper 43 and is laid on the windshield 4.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a front hood;
   a windshield;
   an airbag installed on the front hood and at least partially overlapping the windshield in an expanded state;
   a shell that is fastened on a lower side of the front hood, wherein the airbag is disposed within the shell in a non-expanded state; and
   a detachable connection between the shell and the front hood, wherein the detachable connection comprises at least one plug-in part that engages the shell and that is configured to detach when the airbag expands into the expanded state.

2. The motor vehicle according to claim 1, wherein the front hood comprises an external skin and a reinforcement profile running below the external skin, and wherein the shell comprises openings and wherein the at least one plug-in part engages in the openings of the shell and the reinforcement profile.

3. The motor vehicle according to claim 1, wherein the at least one plug-in part comprises an intended breakpoint.

4. The motor vehicle according to claim 1, wherein the shell comprises a front area, and further comprising:
   a permanent connection between the shell and the front hood in the front area of the shell.

5. The motor vehicle according to claim 4, further comprising:
   a reinforcement profile, wherein the permanent connection exists between the shell and the reinforcement profile, and wherein a wall thickness of the reinforcement profile is locally increased in an area of the permanent connection.

6. The motor vehicle according to claim 1, further comprising:
   at least one support arm that is fastened on the front hood and has a free end oriented to the rear, wherein the airbag is held in the shell by the at least one support arm.

7. The motor vehicle according to claim 6, further comprising:
   a screw, wherein the at least one support arm is fastened between the front hood and the shell by the screw.

8. The motor vehicle according to claim 1, further comprising:
   a water pan that extends below the shell and between the windshield and the front hood.

9. The motor vehicle according to claim 8, further comprising:
   a seal situated between a front edge of the water pan and a front edge of the shell.

10. A motor vehicle, comprising:
    a front hood;
    a windshield;

a water pan extending from the windshield up to below the front hood;

an airbag that is installed on the front hood and at least partially overlaps the windshield in an expanded state; and a shell fastened on a lower side of the front hood, wherein the airbag is located in the shell in a non-expanded state and between the lower side of the front hood and the water pan.

11. The motor vehicle according to claim 10, further comprising:

a detachable connection to the front hood, wherein the detachable connection is provided at least along a rear edge of the shell.

12. The motor vehicle according to claim 10, wherein the water pan comprises:

a front trough;

a rear trough; and a wall running below a rear edge of the front hood that divides the water pan into the front trough and the rear trough.

13. The motor vehicle according to claim 12, wherein the wall is deformable under pressure of the airbag when expanding into the expanded state.

14. The motor vehicle according to claim 10, further comprising:

at least one nozzle of a windshield washing apparatus installed on a shell.

15. The motor vehicle according to claim 14, wherein the shell comprises an outer side, and further comprising:

a coupling part situated on the outer side of the shell; and a supply hose that extends between the at least one nozzle and the coupling part situated on an outer side of the shell.

* * * * *